(12) United States Patent
Schwedt et al.

(10) Patent No.: US 11,366,301 B2
(45) Date of Patent: Jun. 21, 2022

(54) METHOD AND APPARATUS FOR IMAGING SAMPLES BY MEANS OF MANIPULATED EXCITATION RADIATION

(71) Applicant: Carl Zeiss Microscopy GmbH, Jena (DE)

(72) Inventors: Daniel Schwedt, Jena (DE); Tiemo Anhut, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 50 days.

(21) Appl. No.: 17/108,288

(22) Filed: Dec. 1, 2020

(65) Prior Publication Data

US 2021/0165200 A1 Jun. 3, 2021

(30) Foreign Application Priority Data

Dec. 2, 2019 (DE) ...................... 10 2019 218 664.5

(51) Int. Cl.
  *G02B 21/00* (2006.01)
  *G01N 21/64* (2006.01)

(52) U.S. Cl.
  CPC ..... *G02B 21/0076* (2013.01); *G01N 21/6458* (2013.01); *G02B 21/0032* (2013.01)

(58) Field of Classification Search
  CPC ............ G02B 21/0076; G02B 21/0032; G02B 27/0068; G02B 21/361; G02B 26/06; G02B 2207/114; G01N 21/6458
  USPC ........................................................ 348/79
  See application file for complete search history.

(56) References Cited

U.S. PATENT DOCUMENTS

| | | | |
|---|---|---|---|
| 9,500,846 B2 | 11/2016 | Betzig et al. | |
| 2014/0030729 A1* | 1/2014 | Basiji ................. | G01N 21/6458 435/6.14 |
| 2015/0362713 A1 | 12/2015 | Betzig et al. | |

(Continued)

FOREIGN PATENT DOCUMENTS

| DE | 10 2013 018 672 A1 | 5/2015 |
|---|---|---|
| DE | 11 2015 001 640 T5 | 2/2017 |

OTHER PUBLICATIONS

European Search Report for European Patent Application EP 2021 1269.4 dated May 3, 2021.

(Continued)

*Primary Examiner* — Tung T Vo
(74) *Attorney, Agent, or Firm* — Duane Morris LLP

(57) ABSTRACT

A method and an apparatus for imaging a sample (14). In the method, a first excitation radiation (5) is focused into a volume of the sample (14) and a caused first detection radiation (15) is captured and evaluated in respect of a form of its wavefront. A second excitation radiation (11) is manipulated on the basis of the evaluation results in order to correct the ascertained deviations of the wavefront. A region (20) to be imaged of the sample (14) is scanned by means of the second excitation radiation (11) and a second detection radiation (16) is captured as image data. The second excitation radiation (11) is directed in the form of at least two partial beams (11T) into the sample volume, into a respective spot (22) illuminated by the partial beam (11T) and the second detection radiations (16) respectively caused by the partial beams (11T) are captured separately.

15 Claims, 8 Drawing Sheets

(56) References Cited

U.S. PATENT DOCUMENTS

2016/0209646 A1    7/2016    Hattori et al.

OTHER PUBLICATIONS

German Search Report for Priority DE 10 2019 218 664.5 dated Jun. 9, 2020.
Cha, Jae Won, et al.; "Shack-Hartmann wavefront-sensor-based adaptive optics system for multiphoton microscopy" Journal of Biomedical Optics 2010; 15(4):046022-1-046022-10.
Denk, W., et al.; "Two-photon laser scanning fluorescence microscopy"; Science 1990; 248:73-.
Neil, M.A.A., et al.; "Adaptive aberration correction in a two-photon microscope"; J. Microsc. 2000; 200:105-.
Debarre, D., et al.; "Image-based adaptive optics for two-photon microscopy"; Optics Letters 2009; 34:2495-.
Rueckel, M., et al.; "Adaptive wavefront correction in two-photon microscopy using coherence-gated wavefront sensing"; PNAS 2006; 103:17137-.
Wang, K., et al.; "Rapid adaptive optical recovery of optimal resolution over large volumes"; Nat. Meth. 2014; 11:625-.

* cited by examiner

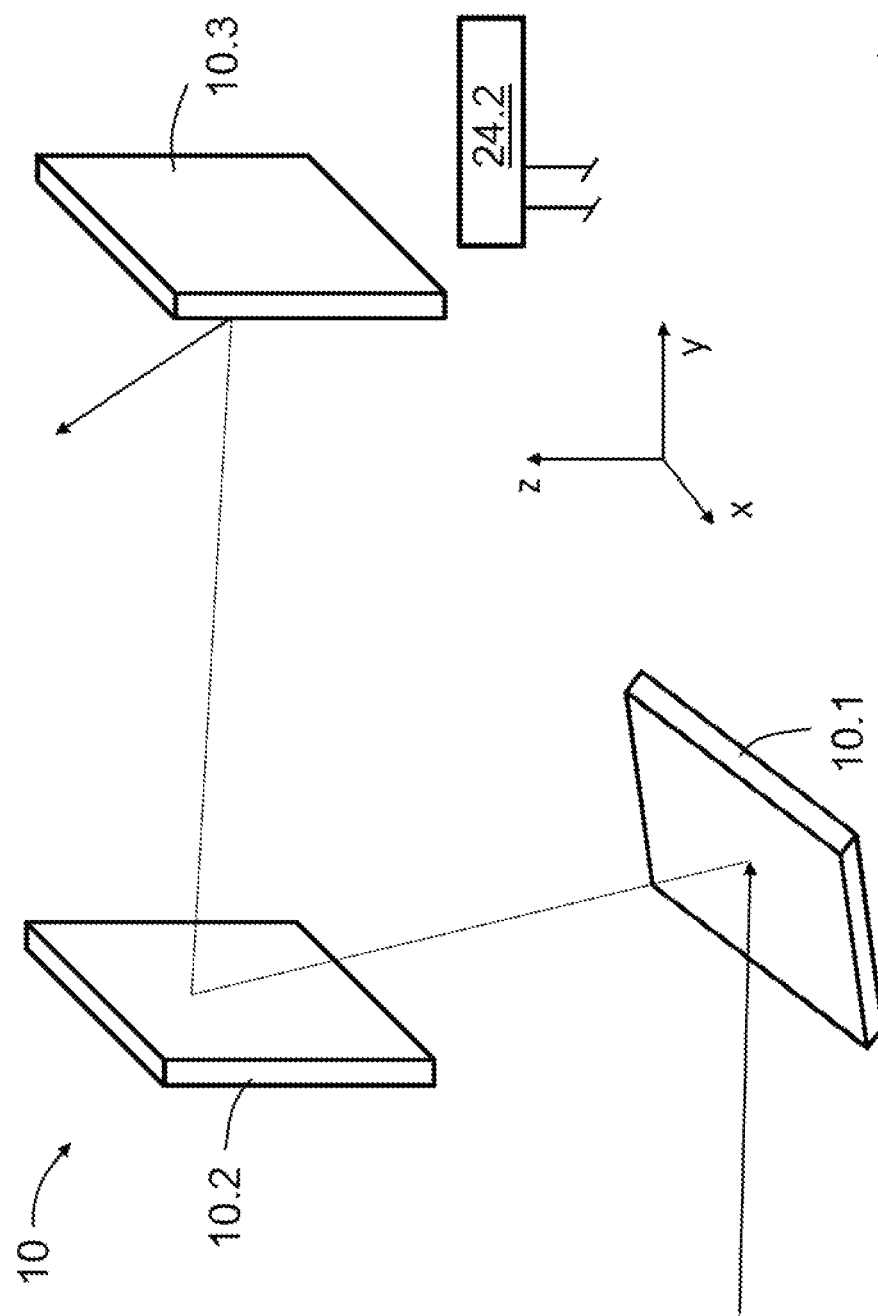

METHOD AND APPARATUS FOR IMAGING SAMPLES BY MEANS OF MANIPULATED EXCITATION RADIATION

RELATED APPLICATIONS

The present application claims priority benefit of German Application No. DE 10 2019 218 664.5 filed on Dec. 2, 2019, the contents of which is incorporated by reference in its entirety.

FIELD OF THE INVENTION

The invention relates to a method and apparatus for imaging samples by means of manipulated excitation radiation according to the respective preamble of the independent claims.

BACKGROUND OF THE INVENTION

Laser scanning microscopy has developed to become one of the most frequently used tools in biomedical research. It allows three-dimensional recordings of samples to be obtained without having to cut the latter up. Moreover, it makes a large bandwidth of processes and applications, which go beyond pure imaging, available to the user. A sustained trend in recent years has been that of functionally examining living tissue or whole organisms.

A challenge for laser scanning microscopes (LSM) is that of also obtaining the already available excellent image quality at greater sample depths in future and, in the process, of also overcoming strongly scattering tissue layers.

To increase the penetration depth of the radiation into the tissue, nonlinear excitation in the near infrared spectral range is resorted to as a rule [W. Denk et al., "Two-photon laser scanning fluorescence microscopy", Science 248, 73 (1990)].

On account of the longer wavelength of the excitation radiation, the latter is scattered to a lesser extent than short wavelength radiation. Therefore, a compact focus can still be generated at greater depths in the sample using longer wavelength excitation radiation. In the process, the nonlinearity of the excitation ensures that, when the fluorescence events are excited, a fluorescence emission is only emitted from the focus or from a small focal volume. This restriction is moreover advantageous in that imaging the fluorescence as detection radiation requires no stop (pinhole) for suppressing out-of-focus components of the detection radiation in order to achieve the optical intersection. Scattering of the fluorescence photons is only still bothersome if these no longer remain within the aperture of the microscope system and are therefore unable to be supplied to the detection. The quality of the detection PSF only still plays a subordinate role. A further advantage of the nonlinear optical excitation consists of the fact that fluorescence is hardly excited away from the focus. Consequently, the dye is not bleached there either and there are hardly any phototoxic effects. Moreover, long wavelength optical radiation hardly leads to DNA damage.

It has been known for some time that the image quality of a nonlinear LSM can be increased significantly if the aberrations of the wavefront of the excitation radiation, caused by scattering in the sample, can be confronted by adaptive-optical processes and hence can ultimately be compensated [M. A. A Neil et al., "Adaptive aberration correction in a two-photon microscope", J. Microsc. 200, 105 (2000)]. Here, the excitation volume is reduced and hence a greater modulation contrast is obtained. In order to ascertain the information needed to set the wavefront manipulation, use is often made of image-based approaches, which iteratively approach the image improvement [D. Débarre et al., "Image-based adaptive optics for two-photon microscopy", Opt. Lett. 34, 2495 (2009)]. The problem here is that a multiplicity of images have to be recorded until the desired image quality is reached. As a rule, such methods are therefore slow and can damage the sample by the repeated illumination with excitation radiation.

A further approach is directed at the measurement of the wavefront. This can be implemented interferometrically [M. Rueckel et al., "Adaptive wavefront correction in two-photon microscopy using coherence-gated wavefront sensing", PNAS 103, 17137 (2006)] or using a Shack-Hartmann sensor (SHS) [J. W. Cha et al., "Shack-Hartmann wavefront-sensor-based adaptive optics system for multiphoton microscopy", J. Biomed. Opt. 15, 046022 (2010)]. Shack-Hartmann sensors are camera systems with an upstream microlens array (MLA). If light with a plane wavefront is radiated on the Shack-Hartmann sensor in perpendicular fashion, a pattern arises, which is formed by light spots respectively centered with respect to the sub-apertures of the MLA. Deviations of the light spots from the centers of the sub-apertures are a measure for the local gradient of the wavefront. Consequently, this technology supplies the radiated-in wavefront for each camera image. Consequently, at best, there can be an update rate of the wavefront information that is of the order of the frame repetition rate of the SHS camera.

Wang et al. [K. Wang et al., "Rapid adaptive optical recovery of optimal resolution over large volumes", Nat. Meth. 11, 625 (2014)] and U.S. Pat. No. 9,500,846 B2 have shown that the application of an SHS based on an EM-CCD on fluorescence emission following multi-photon excitation is advantageously usable to determine the wavefront disturbance by the sample and manipulate the excitation wavefront in such a way that a significant increase in image quality can be obtained for subsequently captured images, even for a comparatively large penetration depth into the sample.

The known methodology of correcting the wavefront of the excitation radiation is relatively slow, however, and operates at high intensities of the excitation radiation. It is therefore not suitable for imaging and observing radiation-sensitive and/or quickly changing samples.

OBJECT OF THE INVENTION

The invention is based on the object of proposing an option for imaging samples, in which the sensitivity of the image capture is increased in relation to the prior art and which simultaneously facilitates a frame rate that admits an observation of dynamic processes of the sample.

The object is achieved by a method and an apparatus according to the independent claims. The dependent claims relate to advantageous developments of the invention.

DESCRIPTION OF THE EMBODIMENTS

The method for imaging a sample includes the step of focusing a first excitation radiation into a volume of the sample. A first detection radiation caused by the action of the first excitation radiation is captured and evaluated in respect of a form of its wavefront. A second excitation radiation is manipulated on the basis of these evaluation results obtained thus in order to correct the ascertained deviations of the wavefront. The second excitation radiation manipulated thus is focused into the volume of the sample in order to capture image data. Optionally, a second detection radiation caused by the second excitation radiation can be additionally manipulated. A region to be imaged (also referred to as synonymously as "patch" below) of the sample is scanned by means of the manipulated second excitation radiation and the second detection radiation is captured and image data of the region are obtained. The second excitation radiation is manipulated by virtue of a spatial phase distribution of the second excitation radiation being set in a pupil plane. Here, image data are understood to mean measurement values which serve as output data for generating image representations of the regions to be imaged.

The method is characterized in that the second excitation radiation, more precisely: the beams thereof, is directed in the form of at least two partial beams into the sample volume, into a respective light spot (also referred to as "spot" below) in a relative focal position illuminated by the respective partial beam, wherein the spots are located in an object plane to be captured, which is determined by the relative focal position, and are separated from one another. The second detection radiations respectively caused by the partial beams are captured separately from one another.

The spots respectively generated in an object plane by the focused partial beams of the second excitation radiation are advantageously generated to be so large and at such spacings from one another that these are clearly separated from one another and neither overlap nor contact one another. However, all spots are situated within a region or patch of the object plane to be scanned at this time.

The patches are determined by virtue of the object plane to be captured of the sample being virtually divided into a number of preferably adjoining regions (patches). The wavefront is evaluated for each patch and the second excitation radiation is manipulated on the basis of the result of the evaluation when the relevant patch is passed over. The second excitation radiation specifically manipulated for the relevant patch is used to scan the patch by means of its partial beams. An image of the object plane to be captured is obtained from the totality of the patches. A two-dimensional or three-dimensional image representation of the sample or of parts thereof is implemented by virtue of image data of a plurality of object planes displaced with respect to one another along the optical axis of an employed objective (Z-direction) being combined with one another to form a spatial representation of the sample (also referred to as Z-stack or z-stack).

This procedure allows a local correction of resultant wavefront aberrations. Since aberrations of the wavefront can be different in the various patches of the object plane, a global correction over all patches would be substantially less accurate than the described region-by-region or patch-by-patch correction by means of a wavefront manipulation. Moreover, a high penetration depth of the excitation radiation and the formation of a sufficiently diffraction-limited focus are facilitated by a high quality correction of the (excitation) spot.

The spacing of the spots can be chosen on the basis of the size of the patches and of the sample, on the basis of the wavelengths used for the excitation radiation(s) and on the basis of the specific configuration of the optical arrangement used to carry out the method. By way of example, a spot spacing of 240 μm can be chosen in a scanner intermediate image of a microscope beam path used to carry out the method according to the invention. In the case of a second excitation radiation wavelength of 800 nm this corresponds to ten Airy diameters. Hence, the spots are clearly separated from one another. By way of example, to scan 64 lines per patch with 8×8 patches per image, a single patch could take up an area of 1.9×1.9 mm in the intermediate image and would therefore be twice as large per dimension as a 4×4 spot pattern, for example. Almost the entire scanning field could be covered by an 8×8 grid of these patches. A sample volume or an object plane was scanned with a field number of 22.

The field number specifies the diameter of the field in the intermediate image of the beam path in millimeters. This intermediate image need not be present in reality and relates to the so-called reference tube. The magnification specifications on the respectively employed objectives apply thereto. By way of example, a field of view is scanned by an LSM with a field number of 22 if, for example, an objective with a 20× magnification is used and a field with a diagonal of 22 mm/20=1.1 mm is scanned in the sample plane (object plane).

The first excitation radiation can differ from the second excitation radiation and can have, for example, a different wavelength and/or a different intensity. The respective excitation radiations can be provided by different light sources. The first and second excitation radiation could also be the same. Advantageously, only one light source is needed in this case. The scope of the invention includes radiation of the light source being used to excite the first detection radiation and to evaluate the wavefront and consequently representing the first excitation radiation. Moreover, the second detection radiation can be caused by radiation of the same light source on the basis of the previously generated partial beams as second excitation radiation.

To be able to efficiently manipulate the partial beams together, these are superimposed on one another in a plane that is optically conjugate to the objective pupil and imaged on a wavefront manipulator in one configuration of the method according to the invention. The latter allows the partial beams to be manipulated together. Apart from a spot-dependent tilt, exactly the same wavefront corrections act in all spots since all spots emerge from a common pupil. This is justified since all spots scan with the above-determined correction within the so-called isoplanatic patch or region.

In an advantageous configuration of the method, the partial beams can cause spots in the object plane, which spots are present in the form of an array with rows and columns. Scanning a respective patch by means of the array can be undertaken along the direction of the rows and/or columns, or along any desired directions.

By way of example, such an array can be implemented as a 4×4 array. Thus, four spots are caused in each row and in each column in the relevant object plane. By way of example, if these arrays are shifted along a row, a fluorescence radiation can be excited as a second detection radiation by each spot of the row and can be captured by means of suitable detectors. Therefore, the excitation can be implemented with an excitation intensity at each time that has been reduced, in particular only equaling a quarter thereof, in relation to scanning with only one spot. A 4×4 parallelization can be used to achieve a 4-fold reduction in the image recording time in relation to the methods known from the prior art, for example only still requiring 0.25 seconds instead of one second as previously (Wang et al., 2014). At the same time, the excitation intensity per spot can advantageously be reduced by a factor of 4. Therefore, the invention allows a faster and more sensitive capture of image data.

Significant improvements are achieved by the method according to the invention in comparison with known methods, in particular in comparison with Wang et al., 2014. Thus, a wavefront averaged within plausibly selected patches yields a significant signal and image improvement when applied to the scan of the entire patch. Moreover, the system can be designed without great latency times. The wavefront can be analyzed by way of a wavefront detector, for example a Shack-Hartmann sensor (SHS), within a time period of 14 ms. A currently set wavefront manipulation can be adapted at the same time. By way of example, a phase pattern of a spatial light modulator (SLM) as a wavefront manipulator is adapted within the aforementioned time period.

The wavefront correction is substantially determined by the frame rate of the camera of the wavefront detector (e.g., the SHS camera) and the update rate of the wavefront manipulator, e.g., an SLM. EM-CCD-based SHS (e.g., SH-EMCCD-fast-468 by Alpao) with a 2 kHz frame rate at 23×23 sampling points for the wavefront determination are currently already available. Using this, the raw data are read within a time of less than 1 ms. Future technologies such as SPAD (single photon avalanche diode) cameras and quanta image sensors (QIS; e.g., CMOS sensors) could potentially become even quicker with greater pixel number. Fast SLMs currently manage updates in less than two milliseconds (e.g., Meadowlark HSP5120L). Hence, any limitation on the capture of (image) data will no longer be acquisition related.

By way of example, if a scanning frequency of 2 kHz is set (corresponding to the "Speed 15" setting in the LSM 780; Carl Zeiss Microscopy GmbH), it is possible to scan 64 image lines within 16 ms. Consequently, it is easily possible to synchronize wavefront manipulation and scanning of a patch by means of the frame trigger of the LSM. Hence, a subdivision of the object field (field of view; FOV) into 8×8 patches would yield an image with a resolution of 512×512 pixels. The scan time for an entire frame would be a quarter of a second (comparison: one second without 4×4 parallelization).

Two scans of a respective region or patch are required both in the methods according to the prior art and in a method according to the invention. Initially, the mean wavefront is ascertained within the patch on the basis of the first detection radiation in order to ascertain a correction term for the wavefront manipulation of the second excitation radiation—and optionally the second detection radiation—therefrom. Then, the actual image scan is collected using the wavefront of the second excitation radiation manipulated and corrected thus. When the method according to the invention is carried out, the total scan time per image is half a second, for example. By contrast, the total scan time as per methods according to the prior art takes two seconds and is consequently 4-times as long.

The method according to the invention can also be configured in such a way that at least one partial beam has an intensity that deviates from the intensities of the other partial beams. Accordingly, the relevant spot is also formed by radiation with an intensity that deviates from the intensity of at least some of the other spots. Such a configuration is advantageous, for example for so-called HDR (high dynamic range) imaging.

The first excitation radiation can be guided over the respective patch and the desired data in respect of the wavefront can be collected. Subsequently, the patch is scanned using the partial beams of the appropriately manipulated second excitation radiation and image data captured. In a further configuration of the method, first and second excitation radiation can be provided at the same time and directed at the sample. By way of example, a beam of the first excitation radiation can be directed at a patch to be captured in future with a relative focal position to be captured in future (object plane offset on the optical axis [z direction]) or at a patch, to be captured in future, of the same object plane, in addition to an array of partial beams of the second excitation radiation. The patch to be captured in future is only captured in a future capturing step, carried out after a current capturing step, by the second excitation radiation. This configuration advantageously allows a faster image capture since the evaluation results of the wavefront of the future relative focal position (object plane) or of the region to be captured in future are already available at the end of the current capturing step. The future capturing step can be carried out immediately after the current capturing step, facilitating a further doubling of the speed of the method according to the invention.

To carry out the method according to the invention, use is advantageously made of an apparatus for imaging a sample, which apparatus comprises an illumination beam path and a detection beam path.

The illumination beam path comprises at least one light source for providing a first excitation radiation and a second excitation radiation. By way of example, this at least one light source is a pulsed laser light source, which is suitable, in particular, for use with multi-photon excitation. Furthermore, there is an objective for focusing the first and the second excitation radiation into an object plane to be captured of the sample. The objective preferably also serves to capture first and second detection radiation. In order to direct the first and second excitation radiation at the relevant regions or patches and in order to scan the patches, there is at least one unit for beam deflection with at least one scanner. The second excitation radiation is manipulated by means of a wavefront manipulator. The first or the second detection radiation is descanned again by the effect of the unit for beam deflection; i.e., the deflection thereof in the object plane is canceled again in the detection beam path.

A beam splitter serving to separate, firstly, first or second excitation radiation and, secondly, detection radiations is arranged in the detection beam path. Here, a first detection radiation is caused by the first excitation radiation and a second detection radiation is caused by the second excitation radiation.

The second detection radiation is captured by means of a detector arranged in the detection beam path. By way of example, the detector is an image detector, by means of which the second detection radiation is captured as data, in particular as image data. Moreover, there is a wavefront detector for capturing wavefronts of the first detection radiation and an evaluation and control unit for evaluating captured data of the wavefronts of the first detection radiation and for driving the wavefront manipulator on the basis of the evaluation results.

An apparatus according to the invention is characterized in that optical means for generating at least two partial beams of the second excitation radiation are present in the illumination beam path and the image detector is embodied for simultaneous, separate capture of the image data of the detection radiation of the partial beams of the second excitation radiation.

The partial beams can be generated in the illumination beam path by means of a spot generator arranged between the laser light source and the wavefront manipulator. The spot generator can generate a spot pattern, for example a 4×4 array. To this end, use can be made of a further SLM.

The spot generator can be embodied to be able to be switched on and off. In the switched-off state, only one beam reaches the illumination beam path, which is provided as beam of the first excitation radiation in this operating state. The spot generator is switched on while a respective patch of the sample is scanned by the second excitation radiation. The previous beam of the first excitation radiation is either switched off or is included, possibly in modified form, as one of the partial beams of the second excitation radiation in the pattern of spots to be generated.

Alternatively, one of the partial beams can also be defocused in respect of an object plane to be captured currently and can instead be focused as first excitation radiation on an object plane to be captured in future. A corresponding defocus of this partial beam used as first excitation radiation can be generated by means of the wavefront manipulator.

In a further embodiment of the apparatus, partial beams can also be generated from a beam of the second excitation radiation using conventional beam splitting with dielectric layers or beam splitting in waveguides.

To simultaneously capture the second detection radiations caused by the partial beams there can be, for example, a multi-anode photomultiplier (MA-PMT) or a SPAD (single photon avalanche diode) camera as an image detector.

To be able to manipulate the second excitation radiation using only one wavefront manipulator, there advantageously is an optical unit (relay optical unit) in the illumination beam path, as a result of the effect of which the partial beams are superimposed on one another in a plane that is optically conjugate to the pupil of the objective and imaged together on the wavefront manipulator. Two mutually conjugate planes can be generated by means of a so-called relay optical unit. In the process, the objective pupil plane is imaged on the plane of the manipulator, for example the SLM plane. As a result, the phase distribution of the second excitation radiation can be manipulated at this location in the same way as if it were manipulated in the pupil. An image flip occurring due to the effect of the relay optical unit is not obstructive but has to be taken into account in respect of the spatial distribution of the phase pattern.

As a unit for beam deflection, there is a quasi-static scanner for deflecting the first and second excitation radiation in a first direction and a second quasi-static scanner for deflecting the first and second excitation radiation in a second direction orthogonal to the first direction in one embodiment of the apparatus according to the invention. Additionally, there can be a resonant scanner for deflecting the first and second excitation radiation in the first or in the second direction. Such an embodiment is advantageous since the spatial averaging of the wavefront over the patch with a quasi-static galvanometer scanner can no longer be ensured on account of the acceleration of the wavefront analysis with the wavefront detector. The scanners are preferably imaged on one another and arranged in a plane that is conjugate to the objective pupil.

A greater section of the object plane can be passed over during the integration time of, for example, an SHS camera if use is made of an embodiment according to the invention of the unit for beam deflection comprising an additional resonant scanner. The resonant scanner takes care of the line scan. Of the two quasi-static scanners, the quasi-static scanner likewise deflecting in the line direction is used to select the respective patch and only defines an offset angle. Scanning with a resonant scanner brings about an inherent acceleration of the image acquisition on account of its higher scanning frequency, for example by a factor of 4. So as not to have a deterioration in the signal-to-noise ratio (SNR) on account of the shortened pixel dwell time, the 4×4 spot pattern can be used entirely for data averaging.

Thus, in order to improve the SNR, the patches can also be passed over multiple times by the spots in the column direction in further embodiments of the invention. As described above, it is moreover possible to use resonant scanners for the purposes of moving the spots over the patches and hence achieving a 4× increased speed of the data capture. This embodiment option can moreover be combined with the multi-spot capture described above, leading to a super-quick (16×) data capture and image recording.

To spare the sample and protect the latter from unnecessary illumination by excitation radiation, the intensity of the excitation radiation can be attenuated in the time between data acquisition with the wavefront detector and the image acquisition, for example by means of an acousto-optic modulator (AOM).

Two functions should be fulfilled in the detection beam path. Firstly, first detection radiation should be steered onto a wavefront detector. Secondly, second detection radiation should reach an image detector. Different technical measures are possible for implementing these two functions, which measures either impinge both detectors with components of both detection radiations or implement a separation and weighted transmission of the first and second detection radiation as a result of their effect.

By way of example, a variable beam splitter can be arranged in the detection beam path. By way of example, the latter can be embodied as a filter wheel, which has a neutral-dividing trace at a constant radius. Using this, the splitting ratio between the image capture and wavefront detection can be optimized. The filter wheel can also be embodied as a color splitter and have a color profile, for example a spatial variation of the filter edge of a long pass filter. The filter edge is preferably set in such a way that only as much of the long wavelength end of the dye spectrum as is necessary to correctly carry out the evaluation of the wavefront is brought to the wavefront detector. The residual remainder of the signal, in particular that from the intensity maximum, is supplied to the image detector for image capture purposes. Moreover, it is also possible, in the case of multiply doped samples, to set the color splitter in such a way that parasitically excited dyes propagate to the wavefront detector while the desired signal is detected. Moreover, the profiles can also be applied to linearly displaceable substrates, or use can be made of splitter matrices. The aforementioned embodiments of the detection beam path can advantageously have a variable adjustable embodiment so that a manual and/or automatic adaptation to the respectively current operating conditions of the apparatus is possible.

Supplying only first detection radiation to the wavefront detector and second detection radiation to the image detector only can be implemented, for example, by means of a stop, an optical wedge or a mirror in the detection beam path. If use is made of a stop, the latter can be arranged upstream of the image detector in the detection beam path, at the location of an intermediate image, in particular of a relay optical unit for suppressing out-of-focus components of the first and second detection radiation. Here, the stop diameter is approximately the same size as the selected spacing of the spots.

In a further embodiment of the apparatus, a further wavefront manipulator is present in the detection beam path, upstream of the image detector. It serves to manipulate the second detection radiation on the basis of the evaluation results of the first detection radiation. This increases the focusability of the fluorescence radiation of the second detection radiation and crosstalk between the second detection radiations of the respective spots is significantly reduced. This embodiment advantageously increases the parallelizable penetration depth of the imaging method according to the invention and of the microscope or the apparatus according to the invention.

All wavefront manipulators present are connected to an evaluation and control unit, which in turn receives data from the wavefront detector. The evaluation and control unit can comprise an evaluation unit embodied to read the wavefront data of the wavefront detector, to evaluate the data, and to ascertain a phase pattern for correcting the wavefront. By way of the evaluation unit, the ascertained phase pattern can be transmitted to the wavefront manipulator, and so the evaluation unit can be embodied as a wavefront control system (wavefront control). By way of example, the control unit can be a system PC. By way of the latter, the image data of the image detector are read and the image acquisition and wavefront correction are controlled, for example.

Furthermore, it is advantageous to arrange a stop in an intermediate image between the unit for beam deflection and the image detector, particularly preferably in the intermediate image of the relay optical unit, said stop suppressing light significantly out of focus (pinhole) for the purposes of increasing the contrast. The greater the penetration depth of the excitation radiations into the sample, the greater the excitation intensities have to be chosen in order to generate a signal from the depth. According to the Beer-Lambert law, the excitation intensity reduces exponentially with penetration depth, which is compensated by virtue of the power of the excitation radiation being increased in depth-dependent fashion with precisely this functional profile. However, in turn, this has as a consequence that two-photon excitation can also occur in the upper sample layers without focusing of the radiation. The goal is to suppress these unwanted fluorescence emissions.

The raw data and/or results of the evaluation of the captured wavefronts can be stored and can be taken into account for subsequent processing of the captured image data. By way of example, these data can be used in the deconvolution of the image data. Here, it is also possible to take account of a spot-dependent tilt. It is moreover possible to catalog ascertained correction data for various sample types and provided these for later applications. It is likewise possible to compare currently ascertained correction data to data from a catalog that are already available. If a catalog with correction data is available, some image recordings can also be corrected on the basis of the catalog data and it is consequently possible to save time and reduce the sample exposure.

The advantages of the invention lie in a faster image recording with, at the same time, a high penetration depth of the excitation radiations and high signal-to-noise ratios. The method according to the invention and the apparatus according invention allow the capture of dynamic processes, even in the case of samples which are sensitive to an illumination by excitation radiation and which could potentially be damaged by the latter.

BRIEF DESCRIPTION OF THE DRAWINGS

The invention will be explained in more detail below on the basis of figures and exemplary embodiments. In detail:

FIG. 8 shows a schematic illustration of a sixth exemplary embodiment of an apparatus according to the invention with two quasi-static and one resonant scanner.

DETAILED DESCRIPTION OF THE DRAWINGS

Below, reference signs used in all figures denote the same technical elements if nothing else is expressly stated in the individual case.

Figure 1:
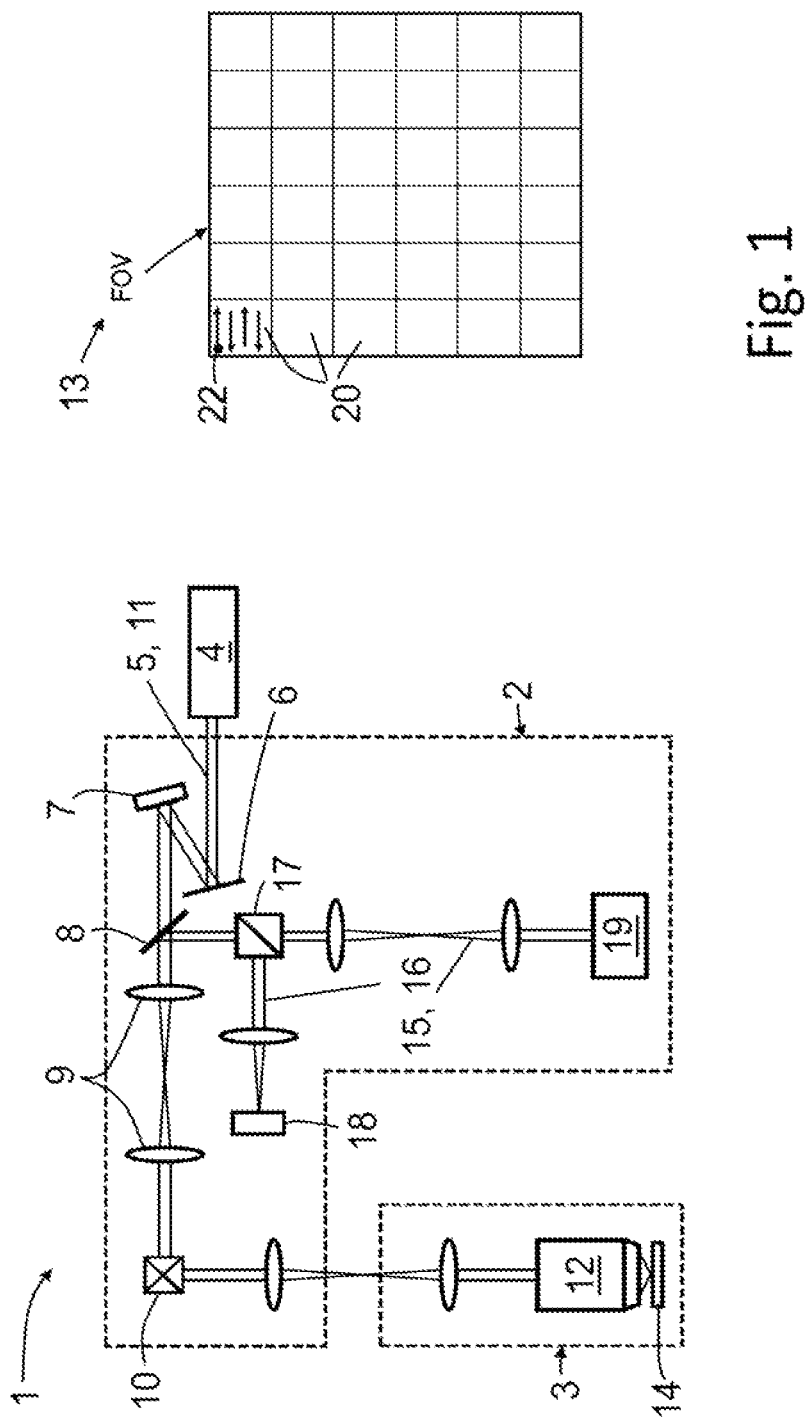
FIG. 1 shows a schematic illustration of a scanning head and of a limb of a microscope and a scanning scheme of selected regions (patches) of an object plane according to the prior art.

The prior art has disclosed the structure of a microscope 1, which has a scanning head 2 and a limb 3 as essential units (FIG. 1). A first excitation radiation 5 and, during the further course of the method, a second excitation radiation 11 are supplied to the illumination beam path of the scanning head 2 from a light source 4 in the form of a pulsed laser, for example a femtosecond laser, and are steered by a mirror 6 onto a wavefront manipulator 7 in the form of an SLM. From the wavefront manipulator 7, the first excitation radiation 5 reaches a unit for beam deflection 10 via a principal color splitter 8 and a system of optical lenses 9. By way of example, said unit for beam deflection contains two quasi-static scanners 10.1 and 10.2 (not shown), by means of which the first excitation radiation 5 and the second excitation radiation 11 is deflected or can be deflected in two dimensions. The wavefront manipulator 7 is arranged optically conjugate to the pupil of an objective 12, just like the scanning mirrors 10.1 and 10.2 and optionally 10.3 (see FIG. 8) which are advantageously imaged onto one another. By means of the objective 12, the excitation radiations 5 and 11 are directed into an object plane 13 (see additional drawing) of a sample 14 to be captured. A first detection radiation 15 is caused in the sample 14 by the effect of the first excitation radiation 5 and a second detection radiation 16 is caused by the effect of the second excitation radiation 11, said detection radiations been captured by means of the objective 12. In particular, the first and second detection radiation 15, 16 are fluorescence radiation. The illumination beam path and detection beam path coincide between the objective 12 and the principal beam splitter 8. The detection radiations 15 or 16 are descanned by the scanners of the unit for beam deflection 10. At the principal color splitter 8, the detection radiation 15, 16 is separated from the respective excitation radiation 5 or 11 and steered to a polarizing beam splitter 17. An output of the polarizing beam splitter 17 is guided to a PMT (photomultiplier) as an image detector 18 for detection purposes. The second output is supplied to a wavefront detector 19 in the form of a Shack-Hartmann sensor (SHS) for wavefront analysis purposes. Consequently, the respectively captured detection radiation 15, 16 is detected in descanned fashion. Since detection radiation 15, 16 in the form of fluorescence radiation is unpolarized, 50% of the radiation reaches the wavefront analysis while the other 50% are detected as image data.

The additional drawing illustrates the scanning scheme or the scanning prescription. The scanning field (field of view, FOV) is virtually subdivided into regions or patches 20, the size of which depend on the type of sample 14, for example. This is often referred to as an isoplanatic patch 20. If the wavefront deformation changes very quickly on account of scattering in the sample 14, the patches 20 are chosen to be very small; if the changes tend to occur slowly—for example, in the case of rather homogeneous, thinly occupied samples 14—then the patches 20 can be chosen to be bigger.

Figure 2:
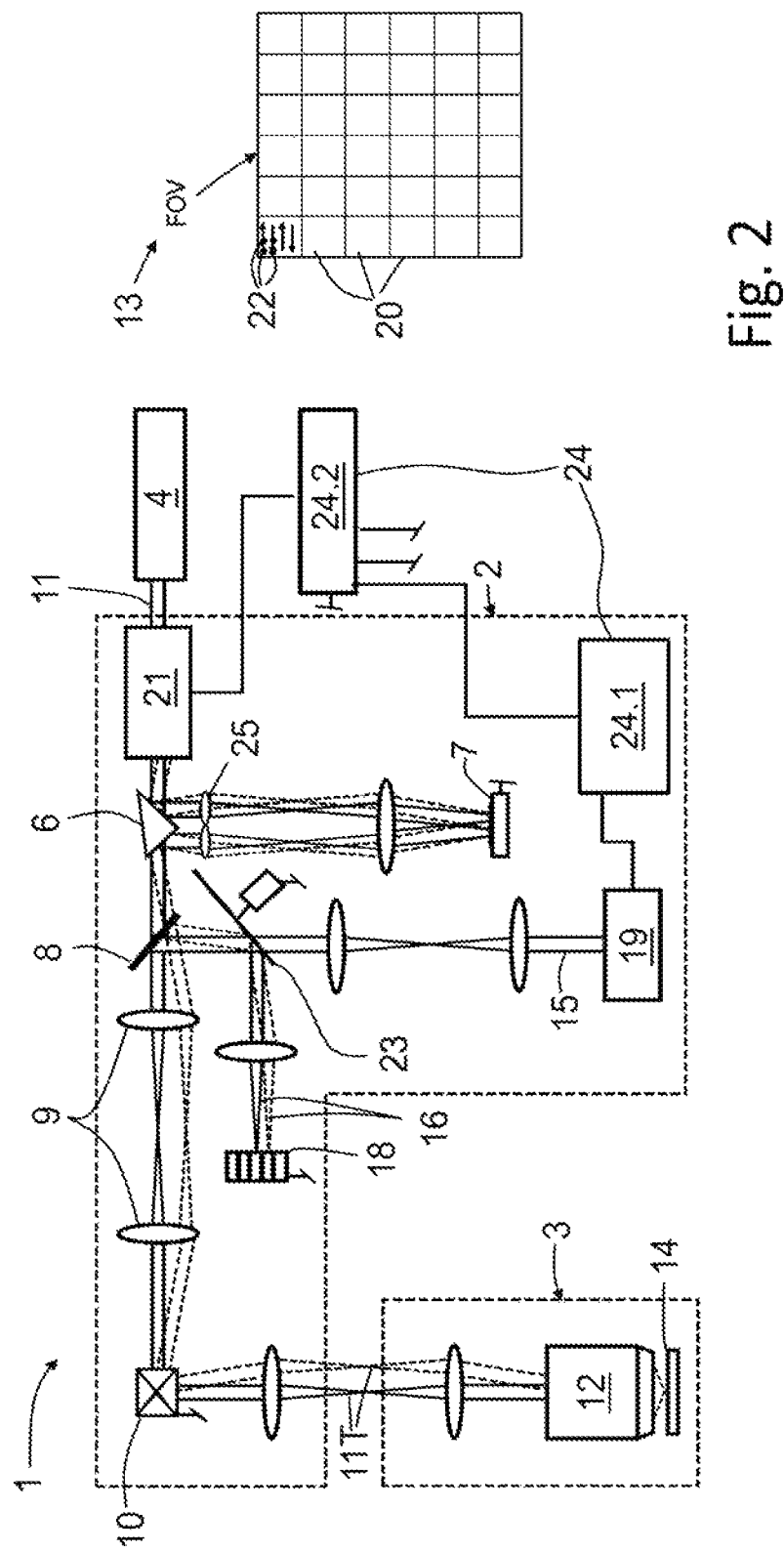
FIG. 2 shows a schematic illustration of a first exemplary embodiment of an apparatus according to the invention with a variable beam splitter and of a scanning scheme of selected regions (patches) of an object plane.

FIG. 2 illustrate a first exemplary embodiment of the apparatus according to the invention. Arranged in the illumination beam path between the light source 4 and the wavefront manipulator 7 there is a spot generator 21 which generates a number of partial beams 11T of the second excitation radiation 11, which are imaged in the object plane 13 in the form of a point pattern or an array of spots 22. By way of example, an array can have spots 22 in four rows and four columns (see FIGS. 3a and 3b). For reasons of clarity, spots 22 are merely shown in a 2×2 array in representative fashion in the additional representation of the scanning scheme of FIG. 2. The spot generator 21, and hence the generation of the partial beams 11T, can be switched on and off by means of a control unit 24.2 of an evaluation and control unit 24. The partial beams 11T are superimposed on one another in a plane that is optically conjugate to the objective pupil. This plane is imaged onto the wavefront manipulator 7 by means of a relay optical unit 25 for the purposes of a wavefront manipulation and, as a result, a wavefront correction. Subsequently, the partial beams 11T of the now manipulated second excitation radiation 11 are guided onward in the direction of the beam deflection unit 10, by means of which the spots 22 of the partial beams 11T are moved over the sample 14 as a point matrix during the image acquisition.

Figure 3A:
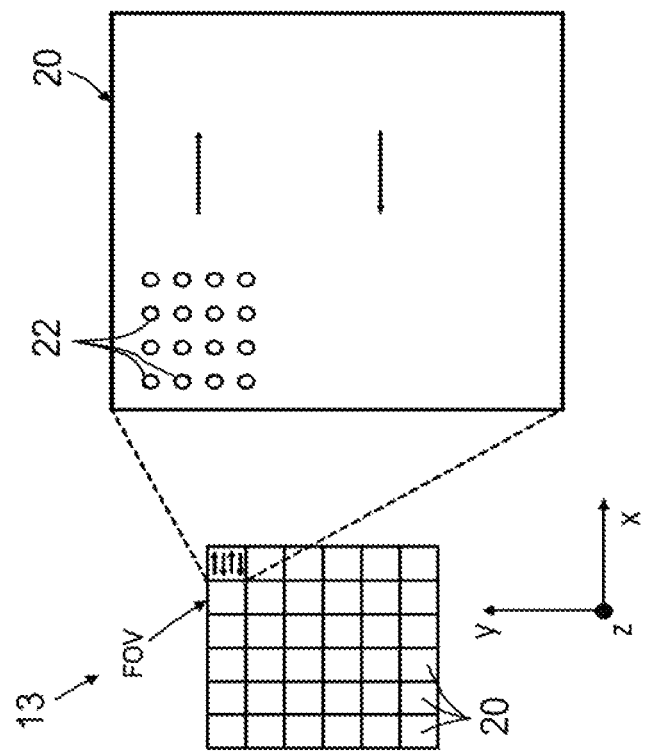
FIGS. 3a and 3b show schematic illustrations of arrays of spots in a patch of respectively one object plane.

The distances of the spots 22 from one another in the FOV are chosen in such a way that although these are separated from one another, they are still significantly smaller than the dimensions of a patch 20 (FIG. 3a).

In the first exemplary embodiment (FIG. 2), a variable beam splitter 23 is arranged in the detection beam path instead of a polarizing beam splitter 17 (see FIG. 1). It is embodied as a filter wheel, which has a neutral-dividing trace at a constant radius. This allows the splitting ratio between detection of the image data and capture of data for the wavefront correction to be set. The variable beam splitter 23 can also have a color profile, which is formed by a spatial variation of a filter edge of a long pass filter, for example. The filter edge is set in such a way that only as much of the long wavelength end of the dye spectrum as is necessary to correctly carry out the evaluation of the wavefront is brought to the wavefront detector 19. The rest of the signal, in particular that from the intensity maximum, is supplied to the image detector 18 for detecting image data, said image data 18 being embodied as a multi-anode photomultiplier (MA-PMT) in the exemplary embodiment In further embodiment options, it is also possible, in the case of multiply doped samples 14, to set the variable color splitter 23 in such a way that parasitically excited dyes propagate to the wavefront detector 19 while the desired signal is detected by the image detector 18.

When carrying out the method according to the invention with an apparatus according to FIG. 2 too, the data for the wavefront manipulation and for acquisition of the image data are captured in two successive scanning steps. To this end, the generation of additional partial beams 11T is switched off when scanning the patch 20 for the purposes of the wavefront evaluation. The first excitation radiation 5 is now steered onto the patch 20 in a beam or a bundle of rays and the said patch is scanned therewith. This is of importance, in particular, if a Shack-Hartmann sensor SHS with an upstream microlens array (MLA) is used as a wavefront detector 19.

Were the evaluation of the wavefronts to be carried out with a multiplicity of partial beams 11T, the different wavefront tilts of the many spots 22 would generate a plurality of signals per microlens. Consequently, a wavefront evaluation and a reconstruction by means of manipulation would not be unambiguously possible.

The capture of the data of the wavefront on the basis of the first detection radiation 15, the evaluation thereof and conversion into control commands is implemented by the interaction of the wavefront detector 19 and the evaluation and control unit 24. The latter can be functionally subdivided into an evaluation unit 24.1 and a control unit 24.2.

The evaluation unit 24.1 is connected in a manner suitable for the transmission of data to the wavefront detector 19 and the control unit 24.2. The latter is connected in a manner suitable for the transmission of data to the wavefront manipulator 7, the unit for beam deflection 10, the image detector 18, the spot generator 21, and the variable beam splitter 23.

By way of example, the evaluation unit 24.1 comprises an FPGA (field programmable gate array), by means of which the deviations of signal spots from expected target positions are ascertained from the image data of the SHS camera by means of a centroid evaluation of said spots generated by the MLA. The local wavefront tilt arises from these deviations. The results for all sampling points supplied by the wavefront detector 19 are interpolated onto the usable grid of the wavefront manipulator 7 and the phase values calculated thus are subtracted from a phase pattern stored on the wavefront manipulator 7. Optionally, a correction factor is taken into account, which re-scales the measured phase pattern of the detection wavelength at the wavefront detector 19 to the excitation wavelength. Consequently, the algorithm determines the duration of the wavefront correction. However, this can be parallelized to a high degree in an FPGA and thus likewise yields a result within a few milliseconds. Consequently, there is a potential here for an acceleration by a factor of 2-3 when determining the wavefront correction. Naturally, such a calculation can also be implemented on a PC or a GPU or CPU, if these are fast enough and have a corresponding high-performance design.

Figure 3B:
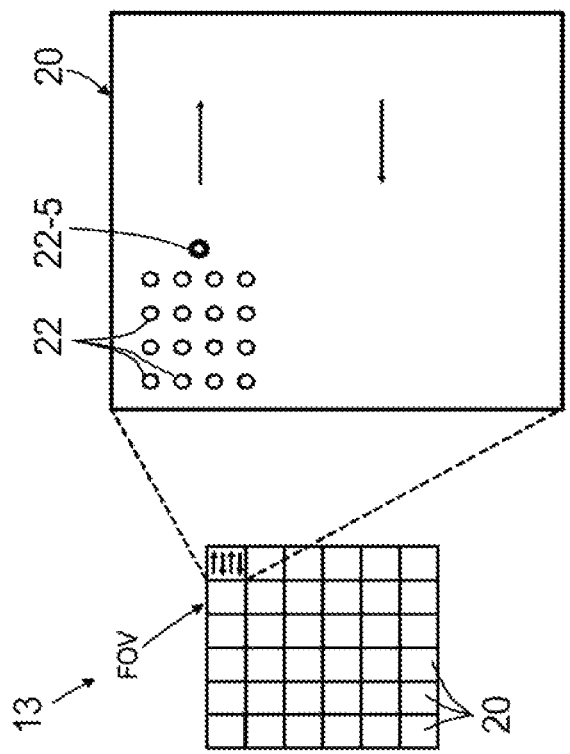

FIG. 3b: In a further embodiment of the apparatus and a further configuration of the method, the first excitation radiation 5 is generated in addition to an array of partial beams 11T and forms a spot 22-5 of the first excitation radiation 5 in the object plane 13 in addition to the 4×4 array shown in exemplary fashion. This beam of the first excitation radiation 5 can be generated by means of a further light source 4 (not shown) or can likewise be generated by means of the wavefront manipulator 7. Then, the beam can be geometrically positioned in such a way that splitting of the first detection radiation 15 from the second detection radiation 16 in the detection beam path can be implemented as conflict-free as possible (in this respect, see also FIGS. 5 and 6).

It is particularly advantageous if the beam of the first excitation radiation 5 is additionally or alternatively defocused by the wavefront manipulator 7 such that the spot 22-5 already scans a patch 20 of an object plane 13 to be captured in future and there already is an evaluation and storage of the wavefront of this patch 20 to be captured in future.

Figure 4:
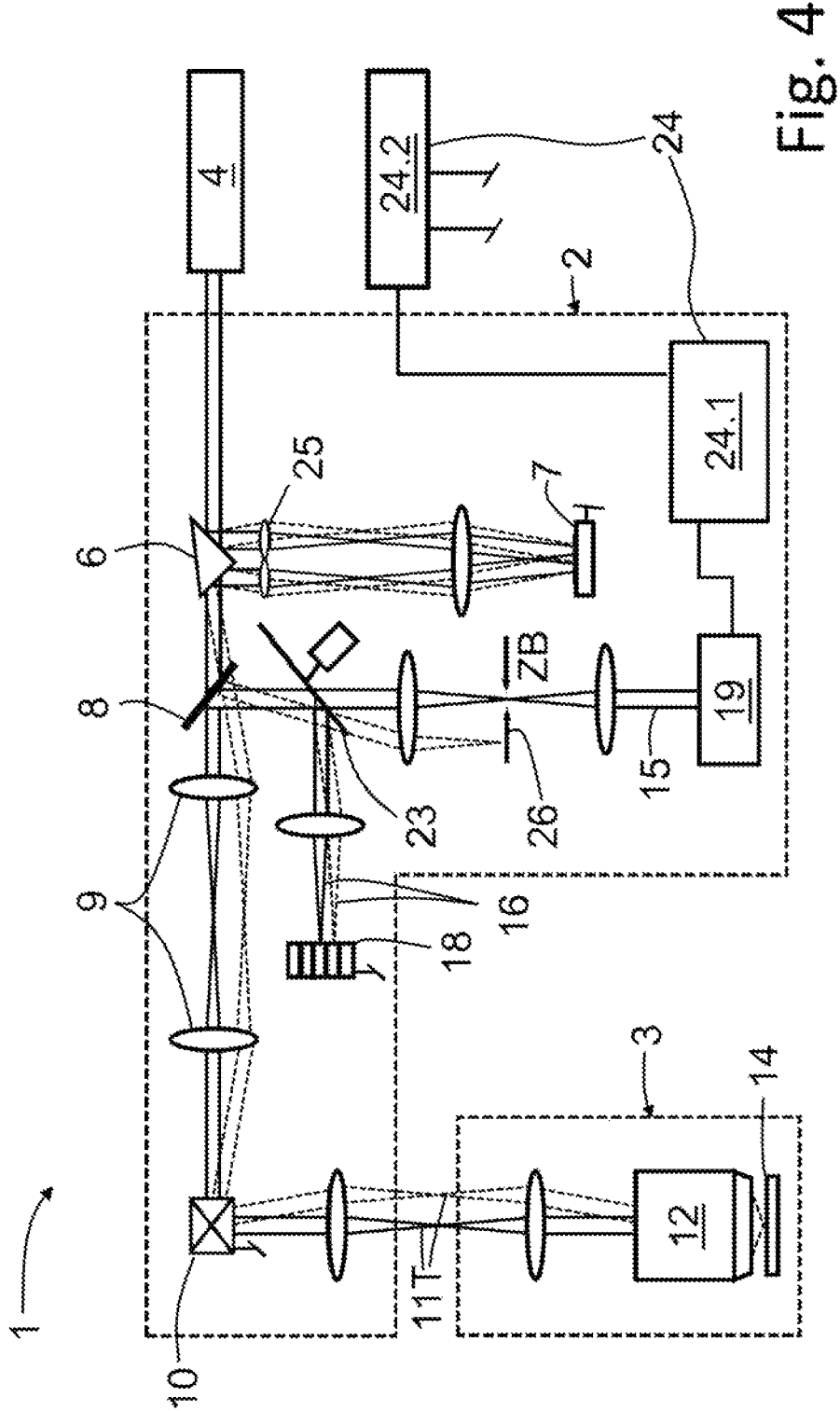
FIG. 4 shows a schematic illustration of a second exemplary embodiment of an apparatus according to the invention with a stop in the detection beam path.

In a second exemplary embodiment illustrated in FIG. 4, the previously described arrangement has been complemented by a stop 26 in the intermediate image ZB upstream of the wavefront detector 19 (FIG. 2). The stop 26 is large enough to let the aberrant point image of the second detection radiation be transmitted to the wavefront detector 19 but it is so small that it blocks all of the other image representations of the spots 22 on the wavefront detector 19. If the values already discussed above in exemplary fashion are considered, then this yields an upper limit of the stop radius of five Airy diameters. Since only one spot 22 is imaged onto the wavefront detector 19, it is no longer necessary to switch off the spot generator 21 (see FIG. 2). It is therefore possible to entirely dispense with a separate spot generator 21. The split of the excitation intensity among the partial beams 11T and the spots 22 caused is implemented by way of appropriately programmed phase gratings on the wavefront manipulator 7, on which the wavefronts to be corrected are superimposed in additive fashion.

Figure 5:
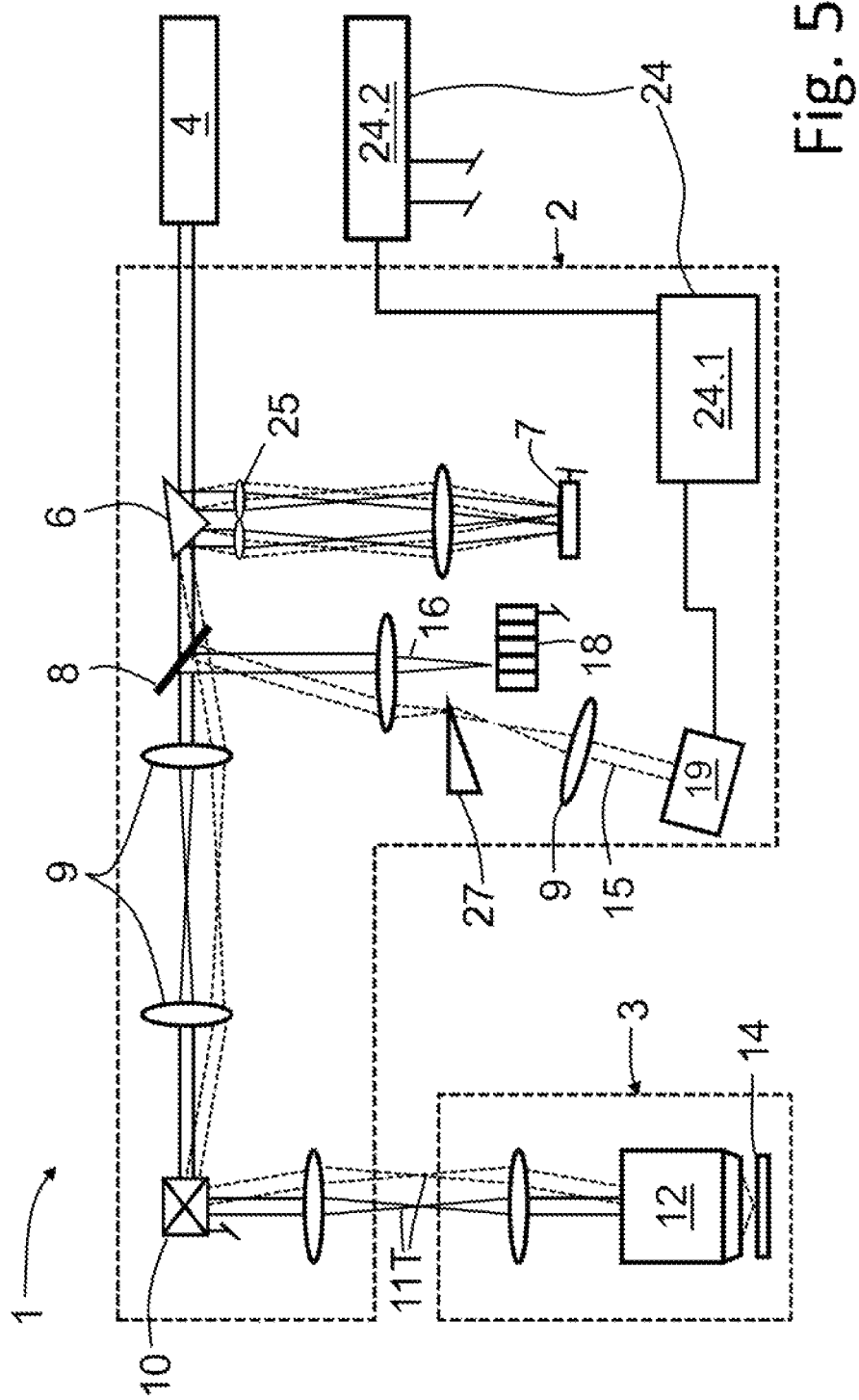
FIG. 5 shows a schematic illustration of a third exemplary embodiment of an apparatus according to the invention with an optical wedge stop in the detection beam path.

The variable beam splitter 23 is entirely dispensed with in a third exemplary embodiment (FIG. 5). Instead, there is a beam-deflecting optical means 27 in the detection beam path, in the vicinity of an intermediate image ZB. As a result of the effect thereof, a first detection radiation 15 originating from a partial beam 11T is deflected from the propagation direction of the first detection radiation 15 and fed to the wavefront detector 19. The beam deflecting optical means 27 is an optical wedge in the illustrated exemplary embodiment. The deflected component of the first detection radiation 15 can be directed at the wavefront detector 19 by means of an optical lens 9.

Figure 6:
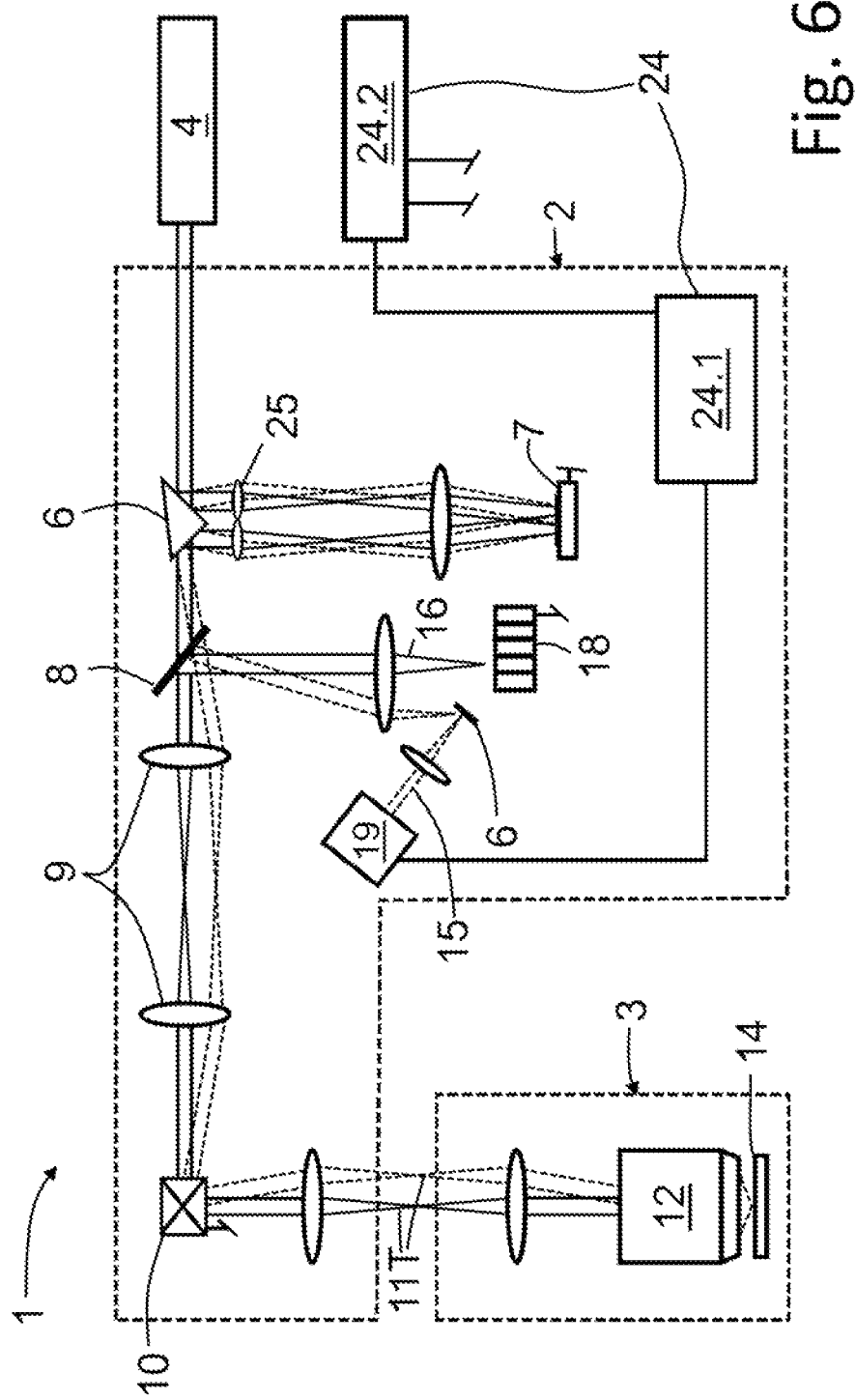
FIG. 6 shows a schematic illustration of a fourth exemplary embodiment of an apparatus according to the invention with a mirror in the detection beam path.

Instead of the wedge, a mirror 6 can also be used for deflection purposes in further possible embodiments of the apparatus (FIG. 6). Here, the first detection radiation 15 is mirrored back with an offset angle and the arising pupil plane is offered to the wavefront detector 19.

Figure 7:
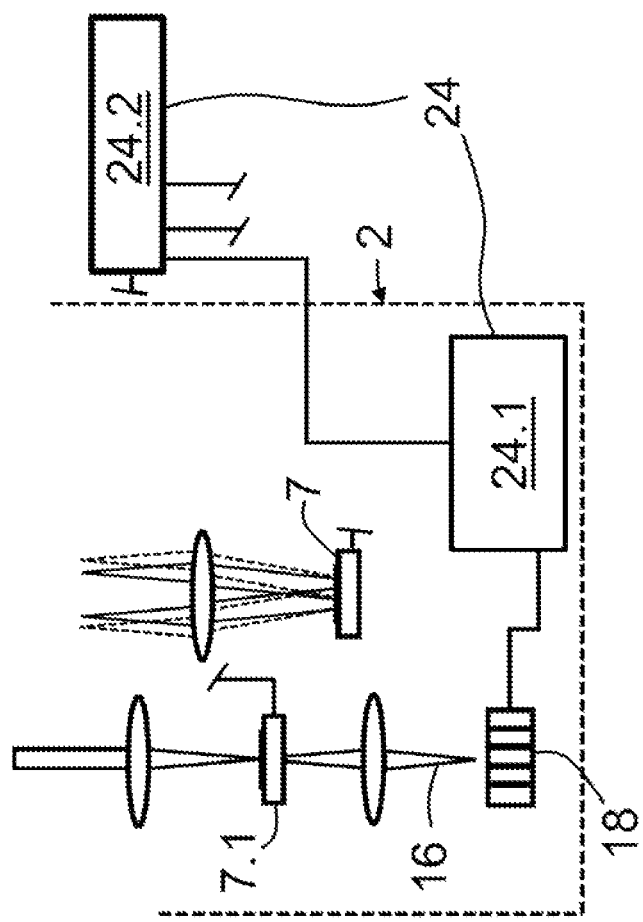
FIG. 7 shows a schematic illustration of a part of the beam path of an optical apparatus with a further wavefront manipulator in the detection beam path as a fifth exemplary embodiment of an apparatus according to the invention.

In a further exemplary embodiment of the apparatus, a further wavefront manipulator 7.1 is present upstream of the image detector 18 in the detection beam path (FIG. 7). All that is illustrated is a part of the illumination beam path with the wavefront manipulator 7 and a part of the detection beam path with the image detector 18. Arranged upstream thereof is the further wavefront manipulator 7.1, which can likewise be embodied as an SLM. The further wavefront manipulator 7.1 is embodied to manipulate the second detection radiation 16 on the basis of the evaluation results of the first detection radiation 15 (see above). To this end, the further wavefront manipulator 7.1 is connected in a manner suitable for the transmission of data (indicated) to the control unit 24.2 and is drivable by means of the latter. The further wavefront manipulator 7.1 serves to correct the wavefront of the second detection radiation 16 upstream of the image detector 18.

FIG. 8 schematically shows scanners of a unit for beam deflection 10. A beam represented in exemplary fashion by an arrow impinges on a first quasi-static scanner 10.1, which deflects the beam in the direction of the y-axis (see FIGS. 3a and 3b) in the object plane 13 and causes a line feed. Subsequently, the beam impinges on a second quasi-static scanner 10.2, which, as a result, steers the beam in the direction of the X-axis, wherein only an offset angle is set by means of the second quasi-static scanner 10.2 and a patch 20 is selected in conjunction with the first quasi-static scanner 10.1. The actual line scan along the x-axis is implemented by an appropriate deflection of a resonant scanner 10.3 which is disposed downstream of the second quasi-static scanner 10.2. An actuation of the quasi-static scanners 10.1, 10.2 and of the optional resonant scanner 10.3 is implemented by means of the control unit 24.2 (shown schematically).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Microscope
2 Scanning head
3 Limb
4 Light source
5 First excitation radiation
6 Mirror
7 Wavefront manipulator
8 Principal color splitter
9 Optical lenses
10 Unit for beam deflection
10.1 First quasi-static scanner
10.2 Second quasi-static scanner
10.3 Resonant scanner
11 Second excitation radiation
11T Partial beam
12 Objective
13 Object plane
14 Sample
15 First detection radiation
16 Second detection radiation
17 Polarizing beam splitter
18 Image detector
19 Wavefront detector
20 Region, patch
21 Spot generator
22 Spot
22-5 Spot of the first excitation radiation 5
23 Variable beam splitter
24 Control unit
24.1 Evaluation unit/WF control
24.2 Control unit/control PC
25 Relay optical unit
26 Stop
27 Wedge

What is claimed is:
1. Method for imaging a sample, comprising
  focusing a first excitation radiation into a volume of the sample,
  capturing a first detection radiation caused by the first excitation radiation and evaluated in respect of a form of its wavefront, manipulating a second excitation radiation, which is focused into a volume of the sample, on the basis of the evaluation results by virtue of a spatial phase distribution of the second excitation radiation being set in a pupil plane in order to correct the ascertained deviations of the wavefront, scanning a region of the sample to be imaged by means of the second excitation radiation, capturing a second detection radiation caused by the second excitation radiation as image data, directing said second excitation radiation in the form of at least two partial beams into the sample volume, into a respective spot in a relative focal position illuminated by the respective partial beam, wherein the spots are separated from one another in an object plane to be captured, which is determined by the relative focal position, and capturing the second detection radiations respectively caused by the partial beams separately.

2. Method according to claim 1, wherein the partial beams are superimposed in a plane that is optically conjugate to the objective pupil, imaged on a wavefront manipulator and manipulated together by said wavefront manipulator.

3. Method according to claim 1, wherein the object plane to be captured of the sample is divided into a number of regions; the wavefront is evaluated for a respective region; the second excitation radiation is manipulated on the basis of the result of the evaluation; and the region is scanned by means of the partial beams of the manipulated second excitation radiation.

4. Method according to claim 3, wherein the spots of the partial beams are caused in the form of an array with rows and columns in the object plane and each region is scanned by means of the array.

5. Method according to claim 1, wherein at least one partial beam has an intensity that deviates from the intensities of the other partial beams.

6. Method according to claim 1, wherein the first excitation radiation is directed into an object plane to be captured in future or at a region to be captured in future, which is only occupied by the second excitation radiation during a future capturing step, which is carried out after a current capturing step, and so the evaluation results of the wavefront of the future object plane or of the future region to be captured are already available at the end of the current capturing step.

7. Method according to claim 6, wherein the future capturing step is carried out immediately after the current capturing step.

8. Method according to claim 1, wherein the second detection radiation is manipulated by means of a further wavefront manipulator before it is captured by means of an image detector.

9. Apparatus for imaging a sample, comprising the following in an illumination beam path:

at least one light source for providing a first excitation radiation and a second excitation radiation, an objective for focusing the first and the second excitation radiation into an object plane to be captured of the sample, a unit for beam deflection, by means of which the object plane to be captured is scanned or can be scanned by means of the first and the second excitation radiation, a wavefront manipulator for manipulating the second excitation radiation, and the following in a detection beam path:

a beam splitter for separating first or second excitation radiation from, firstly, a first detection radiation caused by the first excitation radiation and, secondly, a second detection radiation caused by the second excitation radiation, an image detector for capturing the second detection radiation as image data, and a wavefront detector for capturing wavefronts of the first detection radiation, and also an evaluation and control unit for evaluating captured data of the wavefronts of the first detection radiation and for driving the wavefront manipulator on the basis of the evaluation results, and further comprising optical means for generating at least two partial beams of the second excitation radiation in the illumination beam path and wherein the image detector is embodied for simultaneous, separate capture of the image data of the detection radiation of the partial beams of the second excitation radiation.

10. Apparatus according to claim 9, further comprising an optical unit, as a result of the effect of which the partial beams are superimposed on one another in a plane that is optically conjugate to the pupil of the objective and are imaged together on the wavefront manipulator.

11. Apparatus according to claim 10, wherein the optical means for generating at least two partial beams is able to be switched on and off and, in its switched-off state, only one beam reaches the illumination beam path, said beam being provided as a beam of the first excitation radiation.

12. Apparatus according to claim 9, further comprising a first quasi-static scanner for deflecting the first and second excitation radiation in a first direction and a second quasi-static scanner for deflecting the first and second excitation radiation in a second direction orthogonal to the first direction or comprising the first quasi-static scanner and the second quasi-static scanner and a resonant scanner for deflecting the first and second excitation radiation in the first direction or in the second direction.

13. Apparatus according to claim 9, further comprising optical means arranged in the detection beam path, as a result of the effect of which a component of the first detection radiation is steered onto the wavefront detector.

14. Apparatus according to claim 9, further comprising a stop for suppressing out-of-focus components of the detection radiation arranged upstream of the image detector in the detection beam path, at the location of an intermediate image.

15. Apparatus according to claim 9, wherein a further wavefront manipulator is present upstream of the image detector in the detection beam path, said further wavefront manipulator being embodied to manipulate the second detection radiation on the basis of the evaluation results of the first detection radiation.

* * * * *

UNITED STATES PATENT AND TRADEMARK OFFICE
CERTIFICATE OF CORRECTION

PATENT NO. : 11,366,301 B2
APPLICATION NO. : 17/108288
DATED : June 21, 2022
INVENTOR(S) : Daniel Schwedt and Tiemo Anhut It is certified that error appears in the above-identified patent and that said Letters Patent is hereby corrected as shown below:

In the Specification

Column 10, Line 16 now reads: "an optical wedge stop in the detection beam path;"
Should read -- an optical wedge in the detection beam path; --

Signed and Sealed this
Sixteenth Day of August, 2022

*Katherine Kelly Vidal*

Katherine Kelly Vidal
*Director of the United States Patent and Trademark Office*